Patented Dec. 6, 1927.

1,651,363

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

FERTILIZER PRODUCT AND PROCESS OF PRODUCING THE SAME.

No Drawing.    Application filed December 29, 1923.  Serial No. 683,374.

This invention relates to a new fertilizer product and process of producing the same, wherein powdered commercial calcium cyanamid is so diluted and dispersed, that on treatment with various liquid reagents, and especially with acids, the nitrogenous products formed will be valuable fertilizers. The invention involves especially the addition to powdered calcium cyanamid of another powdered solid, and an intimate mixing of the two so that on treating the mixed solids with acid in an acidulating pan, only cyanamid decomposition products that are beneficial as fertilizers will be formed.

The object of the invention is to increase the value of commercial calcium cyanamid as a source of organic nitrogen, and to make practical the addition of larger amounts of the same in ordinary fertilizer mixtures.

With these and other objects in view the invention consists in the various steps and combinations of steps constituting the process and in the new products resulting from said process, all as will be more fully hereinafter described and particularly pointed out in the claims.

As an example of the process, one may take 100 parts of finely divided commercial calcium cyanimid, intimately incorporate the same with 1000 parts of phosphate rock powder, add to the mixture about 1050 parts of 52 degree Bé. sulphuric acid in an acidulating pan, and after stirring the whole, run the mixture into a den.

It has been found that the dispersing of the calcium cyanamid particles during the reaction period brings about remarkable results as will be clear from what follows: That is to say, it is well known that calcium cyanamid is a chemically active material and is capable under varying physical or reacting conditions of producing salts that differ widely in their properties and that possess different values as plant foods.

For example, when a mass of coarsely crushed commerical calcium cyanamid of the fertilizer grade is thrown into a mixing pan containing phosphate rock and the usual amount of acid, due to heat, moisture and steam, it is subjected to a decomposition before it is completely acted upon by the limited amount of free acid present, largely because its solids are aggregated, more or less, into relatively large masses and not quickly enough brought into the desired intimate contact, throughout their masses, with the acid, during the early part of the incorporation or reaction period. This fact gives rise to undesirable reaction products for the purpose in view. On the other hand, it has been discovered that if said cyanamid is powdered and thoroughly mixed with rock dust and its particles thus dispersed, the reaction or incorporation becomes extremely rapid giving rise to valuable fertilizer products. In such case, there is little chance given for undesirable side reactions taking place, as would be the case if this dispersion is not provided for. Such premixing with rock dust not only greatly decreases the amount of said side reactions, but it also results in an unusually large yield of urea and related useful fertilizer compounds, with a very much lower yield of the less desirable guanylurea and related compounds.

Stated in other language, when commercial calcium cyanamid is decomposed without the above dispersion, dicyandiamid is formed, and it has been determined that this is not a desirable fertilizer material, and if the mass is acidulated after the formation of the dicyandiamid, it is converted into guanylurea or one of its stable derivatives, and the latter compounds in addition to being of a less value than urea, unnecessarily consume a considerable amount of sulphuric acid. It is found, however, that a simple dispersion of the calcium cyanamid particles before acidulation increases the valuable nitrogenous compounds and reduces the less desirable ones.

In first intimately mixing calcium cyanamid powder with phosphate rock powder and then acidulating, one is able to produce a much more valuable fertilizer than would be possible if each were added separately to the acidulating pan. In addition to this, the operation is simplified by reducing two steps to one in the making of fertilizers.

It will now be clear that by proceeding as above disclosed, one is enabled by the simple admixture of powdered crude calcium cyanamid with powdered phosphate rock before acidulation, to not only suppress the production of the undesirable fertilizer products heretofore produced, but to increase the desirable fertilizer products upon acidulation. Further, owing to the particular decomposition thus had, it is found the acid phosphate present in the completed fertilizer is not neutralized to the extent heretofore experienced by the crude calcium cyanamid and therefore more of the latter can be employed in the mixing operations than heretofore. One of the new products produced by this process will contain calcium sulphate, monocalcium phosphate, graphite, urea and some guanylurea. Although in the specific example of the operation of my invention I have described the use of sulphuric acid, my invention is not necessarily limited thereto as the other mineral acids may be substituted for the sulphuric with good results. Nitric, hydrochloric and phosphoric are available, and even gaseous mineral acids as hydrofluoric and carbonic may be used although difficulties arise because of the gaseous character thereof and the corrosiveness of the hydrofluoric acid. But in principle any mineral acid is adapted for the present invention as the function of the acid is merely the acidification of the salts, calcium phosphate and cyanamid.

It is obvious that those skilled in the art may vary the details of the process without departing from the spirit of the invention, and therefore it is not desired to be limited to the above disclosures except as may be required by the claims.

What is claimed is:—

1. The method of controlling the decomposition products of cyanamide compounds which consists in intimately mixing said compounds in a finely divided state with a finely divided rock material; and reacting on the mixture with an inorganic acid.

2. The method of controlling the decomposition products of cyanamide compounds containing commercial calcium cyanamid which consists in intimately mixing said compounds in a finely divided state with a finely divided rock material; and reacting on the mixture with an inorganic acid.

3. The method of producing fertilizer constituents which consists in intimately mixing powdered commercial calcium cyanamid with powdered phosphate rock; and reacting on the mixture with an inorganic acid.

4. The method of decomposing calcium cyanamid and forming valuable fertilizer materials which comprises intimately mixing substantially 100 parts of powdered calcium cyanamid with substantially 1000 parts of powdered phosphate rock; stirring the mixture into substantially 1050 parts of 52 degree Bé. sulphuric acid; and discharging the mass.

5. The method of decomposing finely divided commercial calcium cyanamid and forming valuable fertilizer materials which comprises intimately mixing the particles of said calcium cyanamid with other solids so that on acidulation desirable fertilizer materials will be produced.

6. The method of decomposing finely divided calcium cyanamid and forming valuable fertilizer materials which comprises intimately mixing said cyanamid particles with the particles of finely divided rock material which itself is capable, on reacting with an acid, of forming a valuable fertilizer constituent; and reacting on the mixture thus produced with an inorganic acid to form the desired fertilizer materials.

7. The method of decomposing finely divided commercial calcium cyanamid to form fertilizer constituents which consists in intimately mixing said cyanamid with finely divided phosphate rock; and subjecting the mixture to the action of sulphuric acid.

In testimony whereof I affix my signature.

GEORGE BARSKY.